United States Patent Office 2,734,157
Patented Feb. 7, 1956

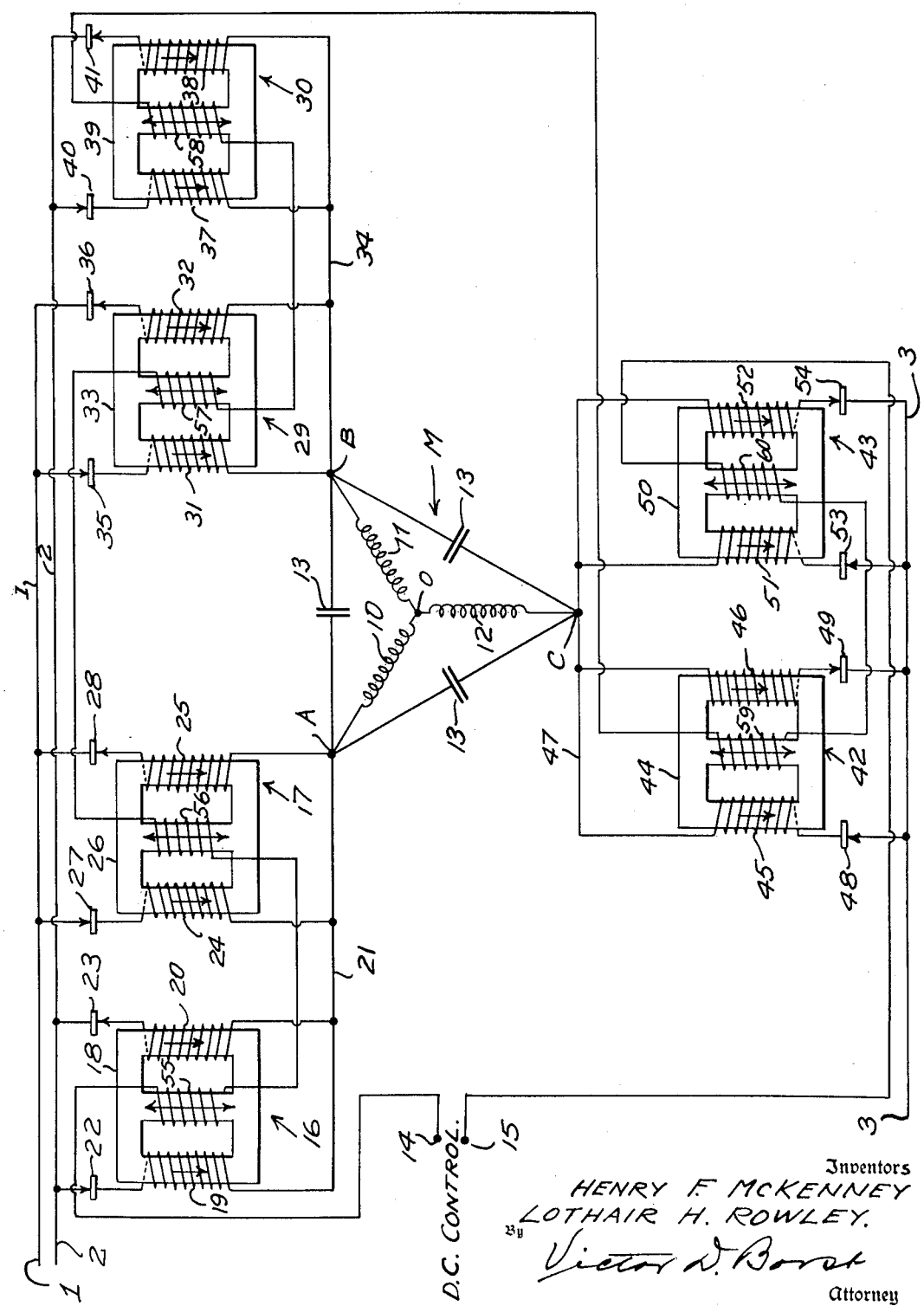

2,734,157

THREE PHASE MOTOR SYSTEM

Henry F. McKenney, Valley Stream, and Lothair H. Rowley, Bellerose, N. Y., assignors to The Sperry Corporation, a corporation of Delaware Application January 15, 1953, Serial No. 331,458

3 Claims. (Cl. 318—207)

This invention relates to a system for controlling and reversing three phase motors, the primary object being to obtain a balanced system which will avoid distortion and thereby improve the power and output characteristic, and which will avoid heating of the motor.

The invention comprehends the use of saturable core reactors to control the voltage of each phase winding of the motor and also to reverse the phase sequence. The problem has been to collapse the electrical voltages in sequence so as to get them all on neutral and thus get a balanced effect without distortion.

The invention contemplates the use of a pair of saturable core reactors connected in parallel to each motor phase winding and control means acting oppositely upon the reactors of each pair so that their impedances are oppositely affected. In order to reverse the phase sequence and thus reverse the motor, the two reactors of each of two motor phase windings are connected respectively to two different phase conductors and the control is such that a reversal of control will reverse the effective phase connections to the two motor phase windings. The reactor connection to the third phase is also controlled so that the impedance on either direction of control is the same as the impedance in the connections for the other two phase windings, while on zero control the impedance in the third phase connection is sufficient to avoid heating of the motor.

In the preferred form of the system, each saturable core reactor includes two closed magnetic circuits with a reactor winding inductively disposed on each, and the control winding is so related to the two magnetic circuits of each reactor that it affects the flux level or degree of saturation in the same sense in both, that sense being relatively reversed in the two reactors of each pair. The two reactor windings on each reactor are connected to the same phase conductor through reversely poled rectifiers. This is necessary in considering each complete cycle since in a given direction of the motor one reactor of each motor phase winding is of low impedance and the other reactor is of high impedance, and vice versa in the opposite direction of the motor; and each reactor must serve as a conductor on both halves of a cycle.

The connection of the third phase winding to the third phase conductor does not of course change on reversal of phase, but two oppositely controlled reactors are required in order to enable this connection to be controlled and maintain the balance on either direction or polarity of control.

The invention will be understood by reference to the accompanying drawing which is a diagram of a system embodying the invention.

The motor M is a three phase motor the phase windings 10, 11, and 12 of which are Y-connected with the usual shunt capacitors 13. The three terminal connections to the several phase windings are designated A, B and C, respectively.

The three phase conductors of the supply system are designated 1, 2 and 3, respectively. The phase windings 10 and 11 are each connected through a pair of saturable core reactors to both phase conductors 1 and 2, and phase winding 12 is connected through a pair of saturable core reactors to phase conductor 3. The control for the reactors is indicated as a direct current control the circuit for which has terminals 14 and 15 and series control windings for the several reactors as will be described.

The pair of saturable core reactors connecting terminal A to phase conductors 1 and 2 in parallel are designated 16 and 17, respectively. Reactor 16 has a three legged core 18 on the two outer legs of which are windings 19 and 20. These two windings are connected at one end to a common lead 21 which is connected to terminal A. The other ends of these windings are connected to phase conductor 2 through oppositely poled rectifiers or one way conducting devices 22 and 23 respectively.

The saturable core reactor 17 is similar in all respects except that its reactor windings are connected to phase conductor 1. The windings 24 and 25 are disposed on the outer legs of a three legged core 26 and are connected at one end to lead 21, and at their other ends to phase conductor 1 through oppositely poled rectifiers 27 and 28, respectively.

Similarly terminal B is connected in parallel to conductors 1 and 2 through a pair of saturable core reactors 29 and 30 which are in all respects like reactors 16 and 17. The reactor windings 31 and 32 of reactor 29 are disposed on the outer legs of a three legged core 33 and are connected at one end to terminal B in parallel through common lead 34 and at the other end to conductor 1 through oppositely poled rectifiers 35 and 36, respectively. Likewise the reactor windings 37 and 38 of reactor 30 are disposed on the outer legs of the three legged core 39 of reactor 30, and are connected at one end to terminal B in parallel through common lead 34 and at the other end to conductor 2 through oppositely poled rectifiers 40 and 41.

The third phase winding 12 is connected to phase conductor 3 through two alternative paths comprising saturable core reactors 42 and 43 which are in all respects like the reactors already described. The three legged core 44 of reactor 42 has reactor windings 45 and 46 on its outer legs which are connected at one end to terminal C through common lead 47 and at their other end to conductor 3 through oppositely poled rectifiers 48 and 49, respectively.

Similarly the three legged core 50 of reactor 43 has reactor windings 51 and 52 on its outer legs which are connected at one end to terminal C through common lead 47 and at their other end to conductor 3 through oppositely poled rectifiers 53 and 54, respectively.

Each reactor has a control winding upon the middle leg of its core, these control windings being numbered 55, 56, 57, 58, 59 and 60, respectively, on reactors 16, 17, 29, 30, 42 and 43. These are connected in series in the control circuit and are wound so as to effect control in the desired sense.

The direction of the flux induced in each leg of the six reactor cores is indicated by arrows. As shown, the reactor windings are so wound that the direction of the induced flux in all twelve outside legs is down. The control windings are successively reversed so as to effect control in opposite senses in the two cores of each pair of reactors. Also the controls in the pairs of reactors connected to terminals A and B are so related that one of the two similarly controlled reactors is connected to conductor 1 and the other one is connected to conductor 2.

It is evident that by this circuit the control current equally affects the voltage applied from the respective phases to terminals A, B and C and that the voltages are similarly collapsed to neutral. The rotating vector is controlled so as to minimize distortion.

Assuming, for example, the polarity of the control current such that terminal 14 is positive and terminal 15 negative. The direction of the control flux of windings 55, 57 and 59 will be down and that of windings 56, 58 and 60 will be up. Therefore reactors 16, 29 and 42 will be of high impedance and reactors 17, 30 and 43 will be low impedance. The voltage of phase conductor 1 will therefore be applied to terminal A through reactor winding 24 and its connections, and in phase 1 current will flow through the leg comprising winding 10 from terminal A to the common point 0, and divides through the other two legs 11 and 12 and flows through lead 34, winding 38 and rectifier 41 to conductor 2, and through lead 47, winding 52 and rectifier 54 to conductor 3. The voltage will of course depend upon the control current. As that voltage collapses that in conductor 2 increases until the voltage at terminal B exceeds that at terminal A and current flows through leg 11 to the common point 0 and thence divides through the other legs 10 and 12 and flows through leg 10, terminal A, winding 25 and rectifier 28 to conductor 1, and through leg 12, lead 47, winding 52 and rectifier 54 to conductor 3. Thus the vector has rotated 120°.

As the voltage of conductor 2 decreases that in phase 3 increases causing a further vector rotation of 120° as the third phase voltage reaches its peak. Current then flows from conductor 3 through rectifier 53, winding 51, lead 47, leg 12 to point 0 where it divides through the other legs to conductors 1 and 2 through rectifiers 28 and 41, respectively.

As the voltage at terminal C collapses that at terminal A increases, causing a rotation of the vector from C to A through the final 120° of the cycle. It will be noted that the voltage collapse is symmetrical for all legs and that a minimum of distortion results.

It is further evident that a reversal of the polarity of the control current causes a reversal of the sequence of voltage cycle between terminals A and B. Reactors 17, 30 and 43 will be relatively blocked out and the paths through reactors 16, 29 and 42 will be relatively opened. The potential of phase 1 will now be applied to terminal B, the potential of phase 2 will be applied to terminal A and the potential of phase 3 will be applied to terminal C as before. However the potential of phase 3 is applied to terminal C in this instance by reactor 42 which is also subject to the same control as are the reactors connected to terminals A and B.

An increase or decrease of control current similarly affects all three phase connections and in this way the desired balance in the control of the motor, free of distortion is obtained.

It will thus be seen that the motor is controlled and reversed by regulation and reversal of polarity of the control current. On zero control current there is no torque on the motor. The potential at terminals A and B is balanced and the impedance in the third phase connection is sufficient to prevent heating the motor when it is not running.

The motor may of course be delta wound and quite obviously the core structure for the reactors may be two separate closed paths in which case each path would have its separate control winding.

Other obvious changes in the details of the system illustrated in the drawing and above particularly described will occur to those skilled in the art within the principle and scope of the invention as defined in the following claims.

What is claimed is:

1. A control system for three phase motors comprising, in combination with a three phase motor having a terminal for each phase, a lead connected to each terminal, a source of three phase current and a conductor for each phase, three pairs of saturable core reactors, each reactor having two closed magnetic circuits and a reactor winding inductively disposed upon each magnetic circuit, the four reactor windings of each pair of reactors having separate connections to the lead for one motor phase winding with those of each pair connected to a different lead and two of the pairs of reactors having the reactor windings of one reactor of each pair connected in parallel to one phase conductor and those of the other reactor of each pair connected in parallel to another phase conductor and the third pair of reactors having their four reactor windings connected in parallel to the third phase conductor, a unidirectional conducting device in series with each reactor winding in said connections, the said devices for the two reactor windings of each reactor being oppositely poled, and a control circuit including a control winding on each magnetic circuit, the control windings being arranged in the same relation to the two reactor windings on each reactor and in push-pull relation to the two reactors of each pair.

2. A control system for three phase motors as defined in claim 1 in which the control windings on the three pairs of reactors are connected in series in the control circuit and are disposed in the same relation on the reactors of the said two pairs which are connected respectively to the said one phase conductor and to the said another phase conductor.

3. A control system for three phase motors comprising, in combination with a three phase motor having a terminal for each phase winding, a source of three phase current and a conductor for each phase, two reactor windings respectively connecting each of two motor phase terminals to one phase conductor, two other reactor windings respectively connecting each of the same two motor phase terminals to a second phase conductor, four reactor windings connecting the third phase motor terminal to the third phase conductor, a unidirectional conducting device in series with each reactor winding, the reactor connections to the same phase conductor from each of the first and second named terminals having their series unidirectional devices oppositely poled and two of the reactor connections from the third terminal to the third phase conductor having their series unidirectional devices poled in one direction and the other two third terminal reactor connections having their series unidirectional devices poled in the opposite direction, and a control circuit having series control windings inductively related to all of the resistor windings and disposed to affect the windings connecting each of the first two motor phase terminals to one conductor in one sense and to affect those connecting each of the first two motor phase terminals to the second conductor in an opposite sense and to affect in one sense one pair of the said four reactor windings connecting the third phase motor terminal to the third conductor and having oppositely poled unidirectional devices and to affect the other pair of said four reactor windings in the opposite sense.

References Cited in the file of this patent

UNITED STATES PATENTS

| 2,414,936 | Edwards et al. | Jan. 28, 1947 |
| 2,440,319 | Wickerham | Apr. 27, 1948 |
| 2,559,538 | Jacobs | July 3, 1951 |
| 2,676,292 | Spencer | Apr. 20, 1954 |
| 2,677,084 | Carleton | Apr. 27, 1954 |
| 2,677,088 | Malick | Apr. 27, 1954 |
| 2,695,982 | Soller et al. | Nov. 30, 1954 |